United States Patent [19]

Frantz

[11] 4,097,248
[45] Jun. 27, 1978

[54] METHOD FOR DECONTAMINATING COMPRESSED GAS

[75] Inventor: Virgil L. Frantz, Salem, Va.

[73] Assignee: Graham-White Sales Corporation, Salem, Va.

[21] Appl. No.: 469,957

[22] Filed: May 15, 1974

[51] Int. Cl.² .......................................... B01D 53/04
[52] U.S. Cl. .......................................... 55/33; 55/62; 55/75
[58] Field of Search .................. 55/33, 208, 179, 75, 55/267, 62

[56] References Cited

U.S. PATENT DOCUMENTS

| | | | |
|---|---|---|---|
| 3,399,510 | 9/1968 | Kauer, Jr. et al. | 55/33 |
| 3,402,529 | 9/1968 | Frantz | 55/267 |
| 3,572,008 | 3/1971 | Hankison et al. | 55/33 |
| 3,734,293 | 5/1973 | Biskis | 55/208 X |
| 3,735,563 | 5/1973 | Adams | 55/179 |
| 3,778,967 | 12/1973 | Kauer, Jr. et al. | 55/33 X |

Primary Examiner—Charles N. Hart
Assistant Examiner—Robert H. Spitzer
Attorney, Agent, or Firm—Wilmer Mechlin

[57] ABSTRACT

Method for decontaminating compressed gas, including in the apparatus for performing the method a separator - dryer unit responsive to the pressure of a compressed gas injected thereinto for centrifugally separating contaminants from and cooling the gas, and depending on cooling of the gas for holding a desiccant in the unit within a temperature range of substantially optimum adsorption efficiency. On periodic interruption of the injection, accumulated contaminants are discharged through a quick-opening drain port by the residual pressure in the unit, the reduction of which admits from a separate regenerating tank through a restricted orifice a reverse flow to the drain port of expanded, decontaminated gas for regenerating the desiccant.

3 Claims, 5 Drawing Figures

METHOD FOR DECONTAMINATING COMPRESSED GAS

BACKGROUND OF THE INVENTION

As indicated by patents to Kauer et al U.S. Pat. No. 3,399,510, Hankinson et al U.S. Pat. Nos. 3,464,186 and 3,572,008, and Glass et al U.S. Pat. Nos. 3,472,000 and 3,592,563, it has heretofore been known not only to dry compressed gases by a desiccant but to utilize a reverse flow of previously dried gas, expanded through a restricted orifice, to regenerate the desiccant. U.S. Pat. Nos. 3,464,186 and 3,572,008 in the embodiments of FIGS. 9 and 1, respectively, further suggest centrifugal separation in a unit containing a desiccant for removing solid and liquid contaminants, and both patent U.S. Pat. No. 3,464,186 and Frantz U.S. Pat. No. 3,402,529 suggest cooling a compressed gas, the former by a conventional refrigerated drying unit but only for condensing entrained liquids. However, while it is elsewhere recognized that the drying capacity of adsorbents in general is at optimum at temperatures below 100° F and, with a few exceptions, decreases very rapidly above that temperature to the point of ineffectiveness, the known prior art fails to suggest either holding the temperature of a desiccant within its range of optimum adsorption efficiency or how this might be accomplished. It is with this problem, among others, that the present invention is concerned.

SUMMARY OF THE INVENTION

The primary object of the present invention is to provide an improved method for decontaminating compressed gas, wherein a contaminant or component entrained in the compressed gas is adsborbed by a desiccant and centrifugal cooling of the gas holds the temperature of the desiccant within its range of substantially optimum adsorption efficiency.

Another object of the invention is to provide an improved method for decontaminating compressed gas, wherein, in the apparatus for performing the method, a desiccant is contained within a separator-dryer unti and the compressed gas, before exposure to the desiccant, is caused to flow in a helical path in the unit not only for centrifugally separating contaminants but for cooling the gas and thereby holding the desiccant within the temperature range in which its adsorption efficiency is substantially optimum.

A further object of the invention is to provide an improved method for decontaminating compressed gas, wherein a contaminant entrained in the gas is adsorbed by a desiccant and the kinetic energy of the gas is the sole source of power not only for centrifugally separating contaminants, cooling the gas and holding the temperature of the desiccant within an efficient adsorption range, but, on interruption of the supply of compressed gas, also for discharging accumulated contaminants and effecting a reverse flow of previously decontaminated gas for regenerating the desiccant.

An additional object of the invention is to provide an improved method for decontaminating compressed gas, wherein, by selecting a desiccant of high adsorption capacity and efficient adsorption substantially to the point of saturation and only partly regenerating the desiccant by a reverse flow of short duration of expanded, previously dried gas, a residual adsorption capacity is obtained sufficient for installations limited in their regenerating cycles.

Another object of the invention is to provide an improved method for decontaminating compressed gas adapted for use with an associated compressor, whether or not fitted with an aftercooler, and cyclically controlled in decontaminating and discharging and regenerating cycles by valving synchronized with the compressor's pumping and idling cycles.

Other objects and advantages of the invention will appear hereafter in the detailed description, be particularly pointed out in the appended claims, and be illustrated in the accompanying drawings, in which:

FIGURE DESCRIPTION

DETAILED DESCRIPTION

Figure 1:
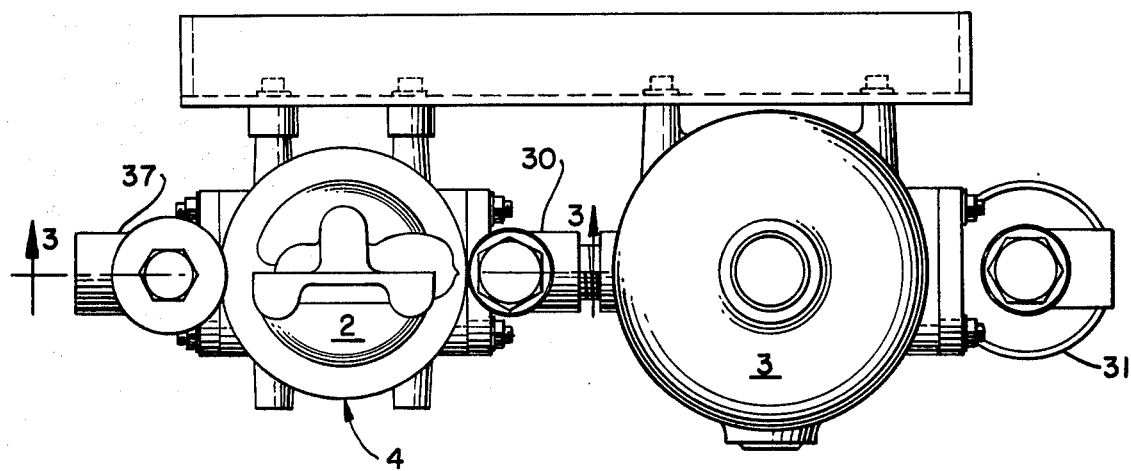
FIG. 1 is a top view of a preferred embodiment of the improved compressed gas decontaminating apparatus for performing the method of the present invention mounted on a suitable bracket.
Figure 2:
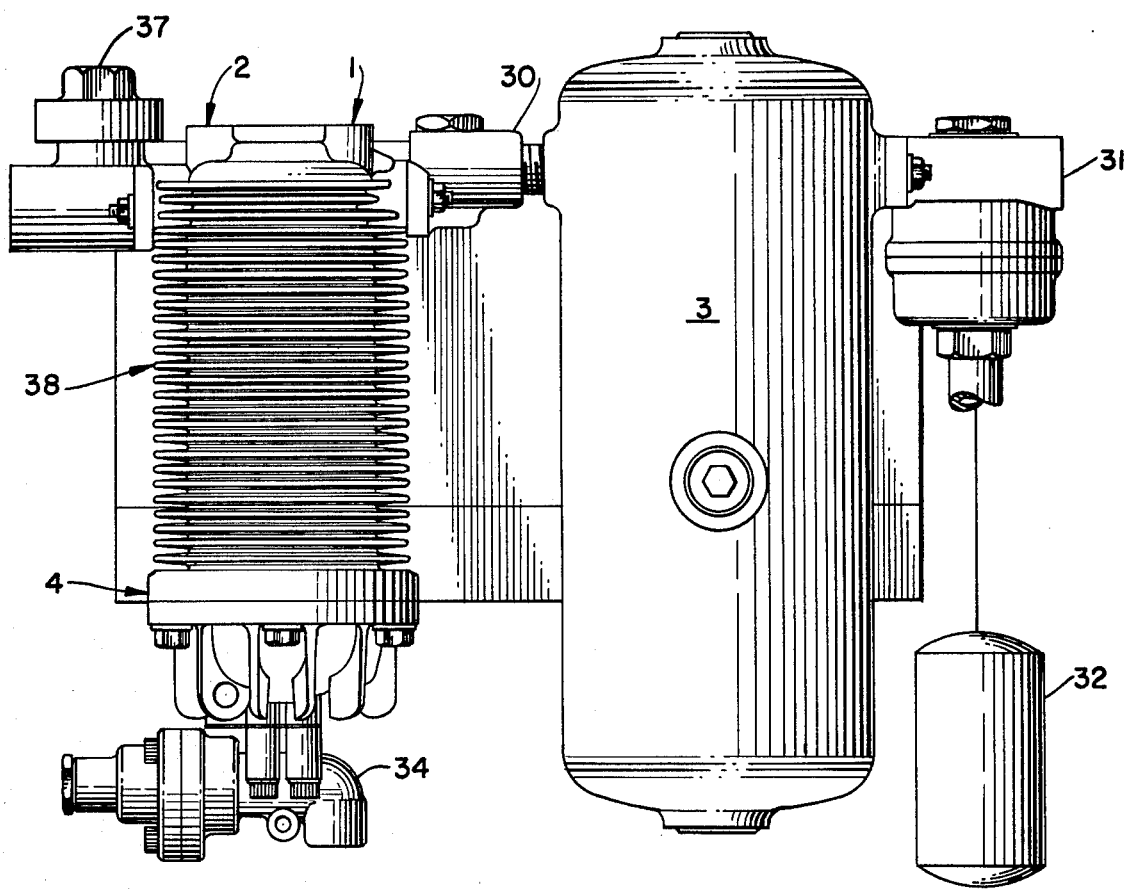
FIG. 2 is a front elevational view of the apparatus of FIG. 1.
Figure 3:
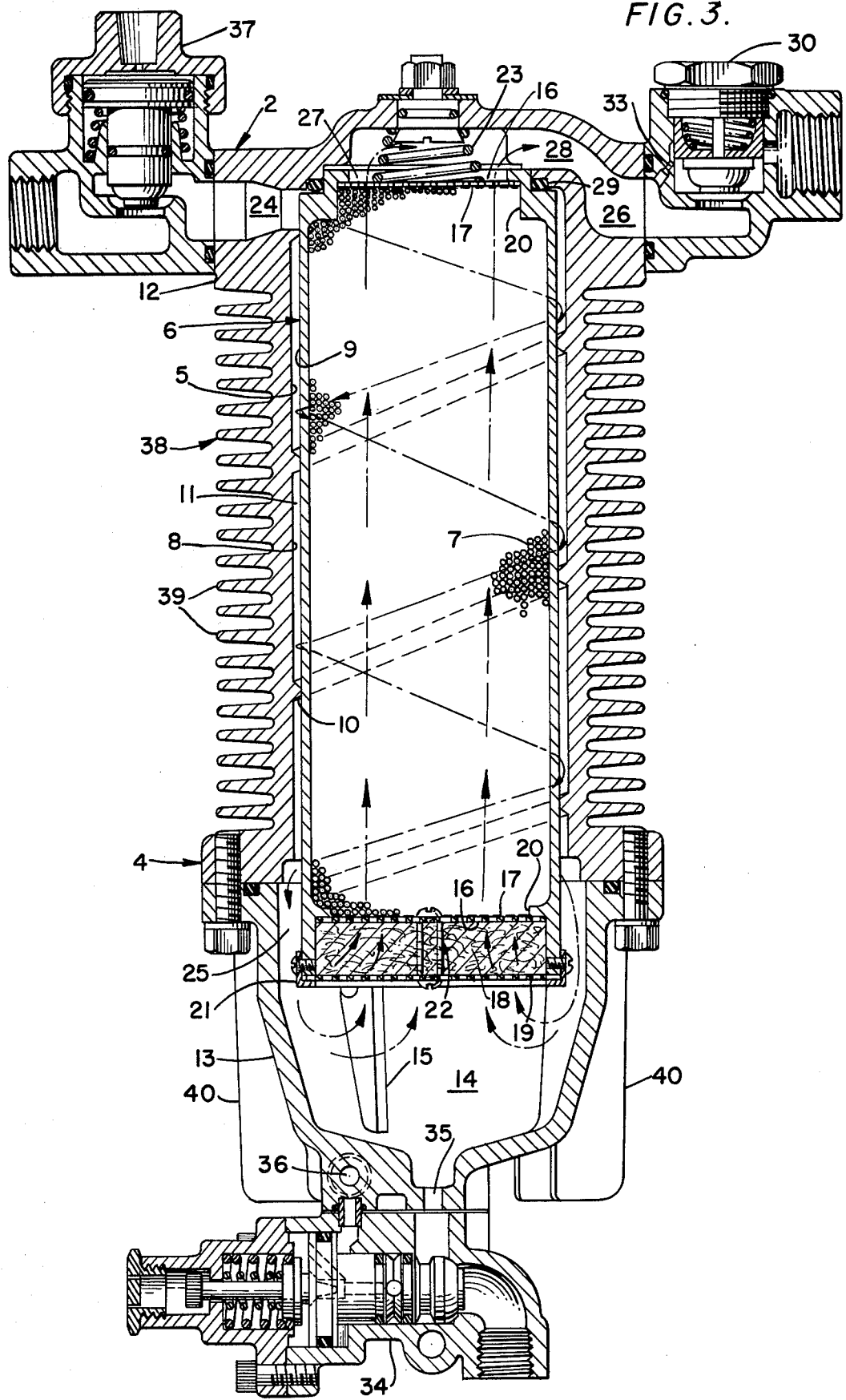
FIG. 3 is a central vertical view taken along lines 3—3 of FIG. 1, but on a larger scale, showing in detail the preferred separator - dryer unit of the improved apparatus.

Referring now in detail to the drawings in which like reference characters designate like parts, the improved compressed gas decontaminating method and apparatus of the present invention are adapted to remove water vapor and other contaminants from compressed gases, self-regenerable for continuous operation under a wide range of ambient conditions, and particularly adapted for use with a conventional compressor (not shown) in vehicle compressed air systems. In such systems water vapor and other contaminants, some introduced by the compressor, are inevitably present in the compressed air from the compressor and must be removed if brakes and other air-operated devices are to be free of clogging, corrosion and freezing. If space permits, the compressor can be fitted with an aftercooler (not shown) to reduce the moisture content by condensation by cooling. However, an aftercooler is of only limited advantage, since the compressed air leaving it not only is saturated but at a temperature much above ambient, typically, in a range of about 140° – 185° F for an entering temperature in a range of about 320° – 360° F.

In all applications, the improved method depends on a desiccant for removing by adsorption water vapor or other contaminant or component entrained in compressed air or other compressed gas. The method also depends on partial conversion of the kinetic energy of the compressed gas into centrifugal force and external heat dissipation not only for cooling the gas but also for holding the desiccant within a temperature range of substantially optimum adsorption efficiency. In describing the invention, the detailed description will particularly describe a preferred embodiment of the apparatus for performing the method and also describe how the preferred method is practiced on that apparatus.

Illustrated as exemplary of the invention, the preferred embodiment of the improved apparatus for performing the method, designated generally as 1, is comprised of a separator - dryer unit 2 connectable on its air inlet side to a source of compressed gas, usually a compressor, and on its air outlet side to a regenerating tank 3. The unit 1 includes a housing or casing 4, preferably of aluminum or other high heat conductivity metal, the housing having a vertical, preferably cylindrical central bore or cavity 5 containing and removably receiving or seating a correspondingly cylindrical, open-ended, high heat conductivity cartridge or canister 6 packed or charged and substantially filled with a desiccant 7. Confronting side or side walls 8 and 9 of the housing 4 and cartridge 6, respectively, are spaced radially or laterally by a continuous fixed helical or spiral rib or baffle 10, suitably integral or rigid with and instanding from the housing side 8, and forming with and between the sides 8 and 9 a downwardly directed helical or spiral air passage or chamber 11. Contained mainly within a generally cylindrical upper part or body 12 of the housing 4, the desiccant cartridge projects or extends therebelow into a lower part of the housing in the form of a cup or bowl 13, bolted or otherwise releasably attached to the upper part. Bounding or containing a sump 14, the bottom cup 12 has vertically directed instanding ribs 15 on which the desiccant cartridge 6 is supported.

The desiccant 7 is contained vertically as a column or bed in the cartridge 6 by top or upper and lower foraminous retaining plates 16. To inhibit escape of dust from the top and capillary flow of oil and like liquid contaminants into the bottom of the column of desiccant, the retaining plates 16 preferably are aluminum-backed and faced toward the desiccant with electromesh screening 17. However, in the illustrated embodiment, the lower plate 16 also separates the desiccant column from a desirable addition in the bottom portion of the cartridge, a bed or pad of preferably stainless steel wool 18 sandwiched between that plate and a foraminous bottom plate 19 and acting as a scrubber for trapping and removing remaining oil and like liquid droplets and solid particles before they reach the desiccant.

The retainer plates 16 conveniently are limited in upward movement by adjoining instanding annular flanges 20 about the top and toward the bottom of the cartridge 6, while a retainer ring or collar 21, releasably attached to the bottom of the cartridge, holds the bottom plate 19 in place and, through the bottom plate and a spacer 22 extending through the scrubber 18 and connecting the sandwiching plates, supports the other contents of the cartridge. If, as illustrated and preferred, the desiccant 7 is in the form of beads or small particles filling the cartridge 6 between the retainer plates 16, it is desirable to mount in the top of the housing 4 a compression spring 23 acting downwardly on the top plate 16 for holding or maintaining the beads in tightly packed relation and thus preventing the beads from forming dust by rubbing against each other.

Opening or connecting at its upper end to an air inlet port 24 in the top portion of the housing 4, through which compressed gas from a compressor or other suitable source (not shown) is injected or introduced into the housing, the helical air passage 11 at its lower end is open or connects to the hollow interior 25 of the cup 13 above the sump 14. An air outlet port 26, also conveniently in the top portion of the housing 4 and spaced thereabout from the inlet port 24, connects to or communicates with the open upper end 27 of the desiccant cartridge 6 through an intervening outlet passage 28 in the housing. Communication between that passage and the helical passage 11 and consequent by-passing of the desiccant, is blocked or sealed by an O-ring or other suitable annular sealing gasket 29 encircling the upper end of the cartridge 6 and acting therebetween and the housing.

The air outlet port 26 leads to the regenerating or purging tank 3 through an interposed or intervening outlet check valve 30. Ordinarily, the tank 3 in turn will connect or lead on its outlet side, through another check valve 31, to a main or storage reservoir, indicated at 32 on a much smaller scale, of the compressed air or other gas system in which the apparatus may be installed. Although both check or one-way valves, the valves 30 and 31 differ in one vital respect. The valve 31 will completely block reverse flow from the reservoir 32 to the regenerating tank 3 and, if the system is used to operate air brakes, must do so to comply with the laws of many jurisdictions. However, blockage by the valve 30 is only partial, a restricted or metering orifice 33 in the valve permitting limited reverse flow of expanded gas into the outlet passage 28 and through the desiccant 7 when the valve is otherwise closed. While usually not necessary, the check valve 31, if desired, can be a combined check valve and filter for subjecting the compressed gas to a final filtering stage before it is transmitted to the reservoir 32 devices.

Besides the outlet check valve 30, the separator-dryer unit 2 is fitted or equipped with a normally closed, quick-opening drain valve 34, suitably suspended from the bottom of the housing 4 and normally closing access to atmosphere of a drain port 35 in the bottom of the sump 14. The drain valve 34 may be solenoid - actuated or, as illustrated, air - actuated and suitably synchronized electrically or pneumatically with pumping and idling cycles of an assodicated compressor. If pneumatic, the actuating air conveniently is applied through a supply port 36 in the bottom of the housing 4 and supplied from the governor line (not shown) of the associated compressor during the latter's idling cycle.

The inlet port 2 also may be valved and, if the associated compressor is equipped with an aftercooler, and should have a valve synchronized in closing with opening of the drain valve 34 to avoid dumping of the aftercooler during the compressor's idling cycle. For the illustrated air-actuated drain valve, the companion valve for the inlet port 24 suitably is the illustrated normally open inlet valve 37 actuated to close by air from the governor line. Alternately, for a compressor without an aftercooler, the inlet valve 37, as in my copending application Ser. No. 412,014, filed Nov. 1, 1973, may be a check valve, predetermined to close under a low pressure of around 4 p.s.i., which will suffice to maintain the compressor's piston rings tight against its cylinder walls.

As in Frantz U.S. Pat. No. 3,402,529, the helical passage 11 in the housing 4 serves to induce or produce in compressed gas injected or introduced through the inlet port 24 a cyclonic or vortical downward flow for centrifugally separating suspended solids and liquids and the separation is enhanced by coupling the cyclonic flow with external finning or ribbing 38 for condensing additional liquid for centrifugal separation by cooling the injected gas. The liquid and solid contaminants, so centrifugally separated from the injected compressed gas, flow or move downwardly along the helical rib 10 to the interior 25 of the cup 13 and collect in the sump 14 for periodic removal on opening of the drain valve 34.

The compressed gas injected into the separator - dryer unit 2 not only is cooled and has contaminants separated therein without resort to internal moving parts or energy other than the kinetic energy of the gas, but, in the presence of the desiccant cartridge 6, maintains or holds the desiccant 7 within a temperature range in which its adsorption efficiency is substantially at optimum. As indicated by the water adsorption - temperature curves of molecular sieves, activated alumina and silica gel on the graph of FIG. 4, the water adsorption capacities of activated alumina and silica gel drop precipitously with increase in temperature above about 75° – 80° F and are reduced to an ineffective level above about 100° F, while the capacity of molecular sieves, although also dropping, is much higher in the range of from 75 or 80° – 100° F and remains higher and still substantial to temperatures somewhat above 200° F. With the purpose of the desiccant 7 in the improved apparatus 1 to adsorb water vapor, molecular sieves, as described under the designation "Zeolite A" or "Zeolite X" in Milton U.S. Pat. Nos. 2,882,243 and 2,882,244, are the logical choice for the above property alone. Among molecular sieves, the preferred desiccant is Molecular Sieve Type A in the smaller or 1/16 inch bead form manufactured by the Linde Division of Union Carbide Corp.

In practicing the improved method of this invention by the illustrated apparatus 1, the separator - dryer unit 2, in the latter's separating - drying or decontaminating cycle or the pumping cycle of the associated compressor, receives or is supplied with compressed air or other gas, injected or introduced or entering through the inlet port 24, into the helical passage 11. In that passage the gas is caused to flow downwardly as a helical cyclone or vortex as it swirls in a spiral or helical path around or about the desiccant cartridge 6. In process, the centrifugal force on the gas, produced by partial conversion from its own motion, centrifugally separates heavier solids and liquids suspended in the gas and also cools the gas.

When the cooled gas reaches the hollow interior 25 of the cup 13, the swirling or cyclonic motion is broken up by the vertical ribs or baffles 15 and the gas is directed or diverted by the cup to flow upwardly through the open-ended cartridge 6 and pass through the scrubber 18, if present, and the desiccant column 7 contained therein. Thereafter, the gas leaves or is discharged or emitted from the top portion of the housing 4 through the outlet passage 28, outlet port 26 and then open outlet check valves 30 and 31 and, as clean, dry gas, flows into and charges the purge tank 3 and the storage reservoir 32 to line pressure.

When the pressure in the reservoir 32 reaches the line pressure predetermined by the setting of the compressor's governor, the latter is activated and, conventionally, causes the compressor to unload or idle and at the same time charges the governor line with compressed gas. As the compressor thus enters or begins its idling or unloaded cycle, in the illustrated embodiment the pressure from the governor line initiates the cleaning or draining and regenerating the cycle of the separator - dryer unit 2 by actuating the drain and inlet valves, 34 and 37, to open the former for discharging collected contaminants from the sump 14 to atmosphere through the drain port 35 under the force of the compressed gas then in the housing, and close the latter for disconnecting the inlet port 24 from the compressor. The consequent rapid exhaustion of the housing to atmospheric pressure creates a pressure differential in favor of the charged purge tank and causes a reverse flow of clean, dry air from that tank into the housing 4 through the restricted orifice 33 in the otherwise closed check valve 30. Greatly expanded and correspondingly reduced in both pressure and relative humidity on emission or ejection from the orifice 33, and also cooled, the extremely dry, low pressure, reverse-flowing gas has such a high relative affinity for moisture and other previously removed contaminants as to regenerate both the desiccant 7 and the scrubber 18 on passing therethrough before exhausting to atmosphere through the drain port 35.

Figure 4:
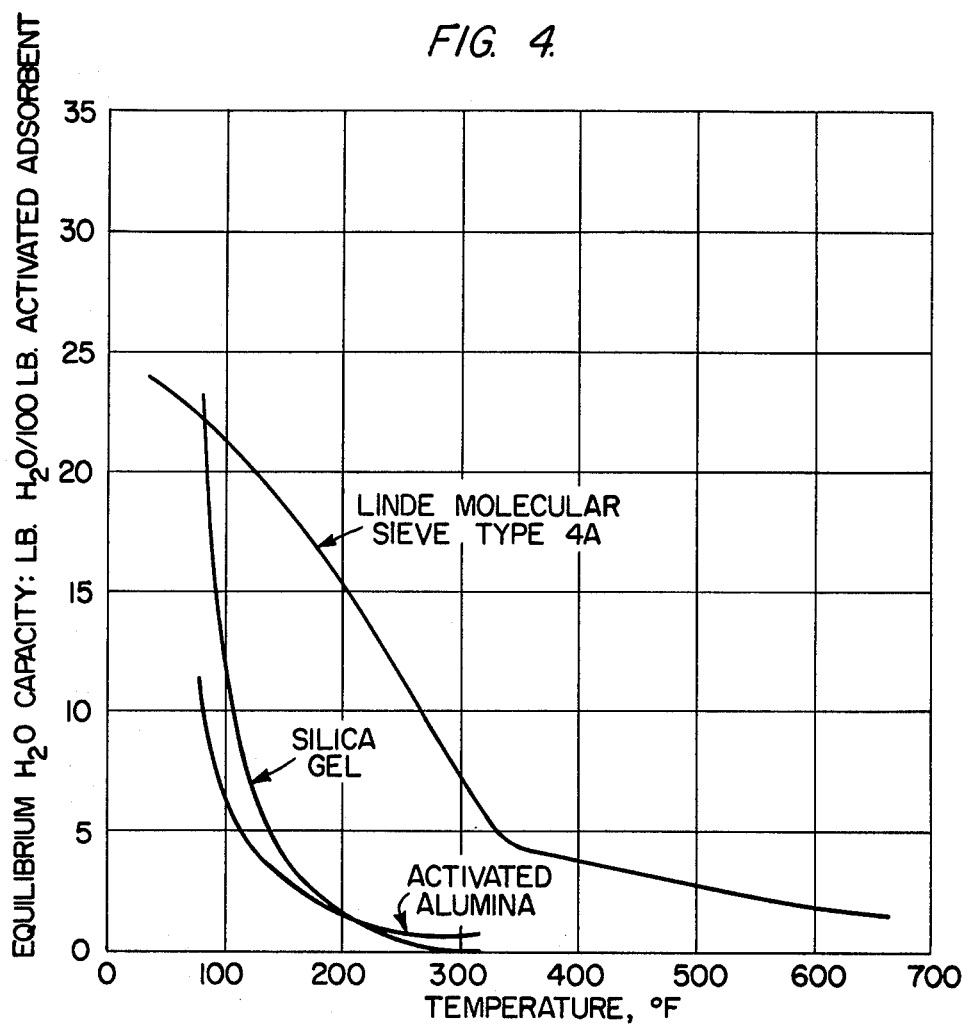
FIG. 4 is a graph showing the relative water adsorption capacities of molecular sieves, activated alumina and silica gel over a range of temperatures.

As previously pointed out with reference to the graph of FIG. 4, desiccants, including molecular sieves, have their optimum or maximum water adsorption capacities and adsorb most efficiently at temperatures below 100° F. It therefore is intended to maintain or hold the temperature of the desiccant within its range of optimum water adsorption capacity and efficiency. In the improved apparatus 1, this task or function falls upon or is performed by the separator - dryer unit 2 and specifically the helical passage 11 in and external ribbing or finning 38 on the housing 4 of that unit, using for energy the kinetic energy of the injected compressed gas. The task is not simple, since, depending on the ambient temperature, type of compressor and whether the compressor is fitted with an aftercooler, the gas may enter the helical passage 11 at temperatures from as low as about 140° F to well over 212° F, with the mean somewhere around 180° F. The following table of temperature and humidity data, taken at start-up and later intervals in a test run conducted with the ambient temperature at a uniform 82° F, is representative of the operation of the unit 2 under average conditions.

| Ambient RH | Inlet Temp. | Cup Temp. | Outlet Temp. | Outlet RH |
|---|---|---|---|---|
| 75% | 140° | 82° | 81° | 10% |
| 65% | 165° | 82° | 82° | 2% |
| 86% | 185° | 89° | 86° | 0.5% |
| 78% | 187° | 92° | 88° | 0.5% |
| 78% | 187° | 92° | 89° | 0.5% |

In the foregoing table, the temperatures in the second, third and fourth columns are the temperatures in °F of the injected compressed gas, respectively at the inlet port 24, in the cup 13 and at the outlet port 26. Given the cooling of the gas in flowing through the helical passage 11, it would be expected that the flow of the cooled gas through the desiccant 7 were responsible for holding the latter within its temperature range of substantially optimum adsorption. However, were this so, the gas should be warmer at the outlet port 26 than in the cup 13 and the difference should be substantial, especially when it is considered that molecular sieve adsorption is an exothermal reaction. Instead, the table shows the outlet temperature in one case to be the same as and in all others to be lower than the cup temperature. Cooling of the desiccant by cooling of the cartridge 6 as the gas swirls therearound is an illogical alternative in view of the temperature at which the gas enters the helical passage. Yet this appears to be the answer, as indicated by a cartridge withdrawn from the housing 4 immediately following a filtering cycle, which, throughout its length, was cold to the touch and a good 20° f below ambient temperature.

The above phenomena are explainable only if the cartridge 6 loses heat to the gas swirling around it, despite the adverse temperature gradient, and is transferred through the gas to the side wall 8 of the housing 4 for dissipation to ambient air through the external finning 38. In turn, this requires that the centrifugal force from the cyclonic flow of the gas push or force most of the mass and with it heat of the gas against the side wall 8 of the housing 4, leaving in contact with the cartridge 6 a layer of relatively cool, light gas for receiving its heat.

In the form illustrated as exemplary of the invention, the separator - dryer unit 2 is designed specifically for use in the compressed air systems of trucks, buses and rapid transit railway vehicles. In such systems the pressures and flow rates of compressed air to the inlet port 26 of the unit 2 are usually around 100 p.s.i. and 13 c.f.m. for trucks and buses and 120–150 p.s.i. and 20 c.f.m. for rapid transit vehicles. As either of these flow rates is lower than desirable for efficient cooling, in the illustrated unit the cross-sectional area of the helical passage 11 is relatively reduced, suitable to about ½ of that of the inlet port 24, with corresponding approximate doubling of the flow rate. The resultant cross-section of the passage 11 suitable is a wide, thin rectangle for maximizing the area of the air exposed to the side 8 of the housing 4, while minimizing the thickness of the relatively low heat transfer coefficient air through which heat mainly is transferred to that side from the side 9 of the desiccant cartridge 6.

In turn, the transferred heat is dissipated from the exterior of the housing 4, most conveniently to ambient air through the external ribbing 38. Preferably, the ribbing 38 includes as its primary heat dissipator vertically but relatively narrowly spaced annular fins 39 of substantially uniform outside diameter, on and projecting horizontally from and extending substantially the full height of the body part 12, with an assist from vertically extending fins 40 on and projecting from and spaced circumferentially about the cup 13.

Figure 5:
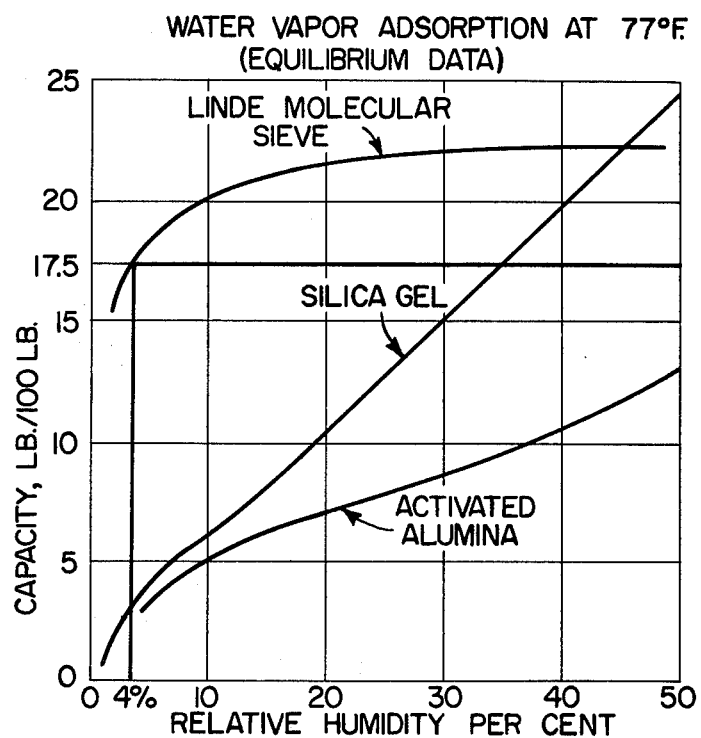
FIG. 5 is an isothermal graph showing the water adsorption - relative humidity curves of the same three adsorbents.

Even though held during the filtering cycle within a temperature range at which its adsorption efficiency is at optimum, the desiccant 7 can only adsorb moisture up to the limit of its capacity. Periodic regeneration or purging therefore is essential to continuous operation of the separator - dryer unit 2. The prior art, disclosing for the purpose a reverse flow of expanded gas, appears to assume that the regeneration obtained is complete and presents no problem. On the contrary, with the quantity of gas and time available for purging both limited, particularly in vehicle compressed air systems, complete regeneration of the desiccants by this method is practically impossible and only partial regeneration is feasible. It is here that the relatively high water capacity and efficiency of adsorption to capacity of the preferred molecular sieve desiccant are of great advantage. Thus, as indicated by the graph of FIG. 5, a Linde Molecular Sieve Type A desiccant at 77° F can adsorb to about 4% relative humidity and still have a residual capacity of about 5 lb. of water/100 lbs. of desiccant when only about 22% regenerated. Except under extremely high ambient conditions of temperature and relative humidity, the adsorption and residual capacity of the unit 2 will be of substantially the same order with a regenerating cycle of as little as 25 seconds. Another benefit derived from use of the preferred molecular sieve desiccant is that if, due to an exceptionally long duty or pumping cycle of the compressor, the desiccant bed 7 becomes saturated, it will recover in the succeeding regenerating cycle.

As mentioned earlier, the clean dry gas from the purging tank 3, by expanding on issuing from the restricted orifice 33, is so drastically reduced in both pressure and relative humidity, compared with the gas in the tank, and has such a high affinity for moisture and other previously entrained liquid contaminants, as, when presented thereto, to desorb the desiccant bed 7 and reentrain liquids trapped in the scrubber 17. The expanded purge gas, since cooled in process of expanding, also has the incidental advantage to the next filtering cycle of preventing the desorbing from heating the desiccant above its temperature range of optimal adsorption efficiency.

The purpose of the purging tank 3 of course is to avoid having to draw purging gas from the reservoir 32. By the same token, the quantity of gas diverted to the purging tank should be far less than that available for storage in the reservoir. That the improved apparatus has this faculty is readily demonstrated. In a typical installation, the exemplary separator - dryer unit 2 will contain around 2.5 lbs. of the preferred molecular sieve desiccant, regeneration of which requires on the average about 2.75 cu. ft. of air at 0 p.s.i.g. or 14.7 p.s.i., obtained in the illustrated embodiment with a 0.0456 diameter restricted orifice 33. With a feed from the compressor to the system of about 13 c.f.m. at 100 p.s.i.g. and an average pumping or duty cycle of 55 sec., the total input at 0 p.s.i.g. is about 454 cu. ft. and only about 0.6% of the total feed is consumed in purging.

From the above detailed description it will be apparent that there has been provided an improved method and apparatus for performing the method of decontaminating compressed gas, that not only hold the desiccant during the decontaminating cycle within a temperature range of substantially optimum adsorption efficiency but require only partial regeneration of the desiccant during the regenerating cycle. It should be understood that the described and disclosed embodiment is merely exemplary of the invention and that all modifications are intended to be included that do not depart from the spirit of the invention and the scope of the appended claims.

Having now described my invention, I claim:

1. A method of adsorbing an entrained component from and cooling compressed gas supplied by a compressor during pumping cycles thereof, comprising containing in a heat conductive container a desiccant adapted to selectively adsorb said component, so passing said gas in a laterally confined path around said container as by partly converting kinetic energy of said gas into centrifugal force to concentrate heat from said gas and container on an outer confine of said path, externally dissipating said heat from said outer confine for cooling said gas and container and therethrough maintaining said desiccant in a temperature range of substantially optimum adsorption efficiency for said component, passing said cooled gas through said desiccant for adsorbing said component, and during idling cycles of said compressor discharging contaminants separated by said centrifugal force from said gas while preventing gas from said compressor from entering said confined path.

2. A method according to claim 1, including periodically regenerating said desiccant by reversely flowing previously dried gas at relatively low pressure therethrough, and wherein said regenerating is consequent upon said discharging.

3. A method according to claim 2, wherein the desiccant is only partly regenerated and the gas, desiccant and adsorbed component are respectively air, a molecular sieve and water vapor.

* * * * *